Aug. 13, 1929.  G. C. CARHART  1,724,451
TRANSMISSION GEARING
Original Filed Feb. 16, 1925   3 Sheets-Sheet 2

Fig. 2

INVENTOR.
George C. Carhart
BY Parsons & Bodell
ATTORNEYS.

Aug. 13, 1929.  G. C. CARHART  1,724,451
TRANSMISSION GEARING
Original Filed Feb. 16, 1925   3 Sheets-Sheet 3

Inventor
George Carhart

Patented Aug. 13, 1929.

1,724,451

UNITED STATES PATENT OFFICE.

GEORGE C. CARHART, OF FLINT, MICHIGAN, ASSIGNOR TO BROWN-LIPE GEAR COMPANY, OF SYRACUSE, NEW YORK, A CORPORATION OF NEW YORK.

TRANSMISSION GEARING.

Application filed February 16, 1925, Serial No. 9,437. Renewed January 11, 1929.

This invention relates to transmission mechanism for motor vehicles of the type having a clutch for relieving the transmission mechanism of the torque of the propeller shaft during gear shifting operation and has for its object a particularly simple and efficient power operated means for throwing out such clutch preliminary to gear shifting operation and letting in such clutch after gear shifting operations, and means operated by parts which are actuated during gear shifting operations for controlling the actuation of the power throw-out means.

The invention consists in the novel features and in the combinations and constructions hereinafter set forth and claimed.

In describing this invention, reference is had to the accompanying drawings in which like characters designate corresponding parts in all the views.

Figure 2 is a plan view of part of the mechanism seen in Figure 1, parts being omitted.

Figure 1:
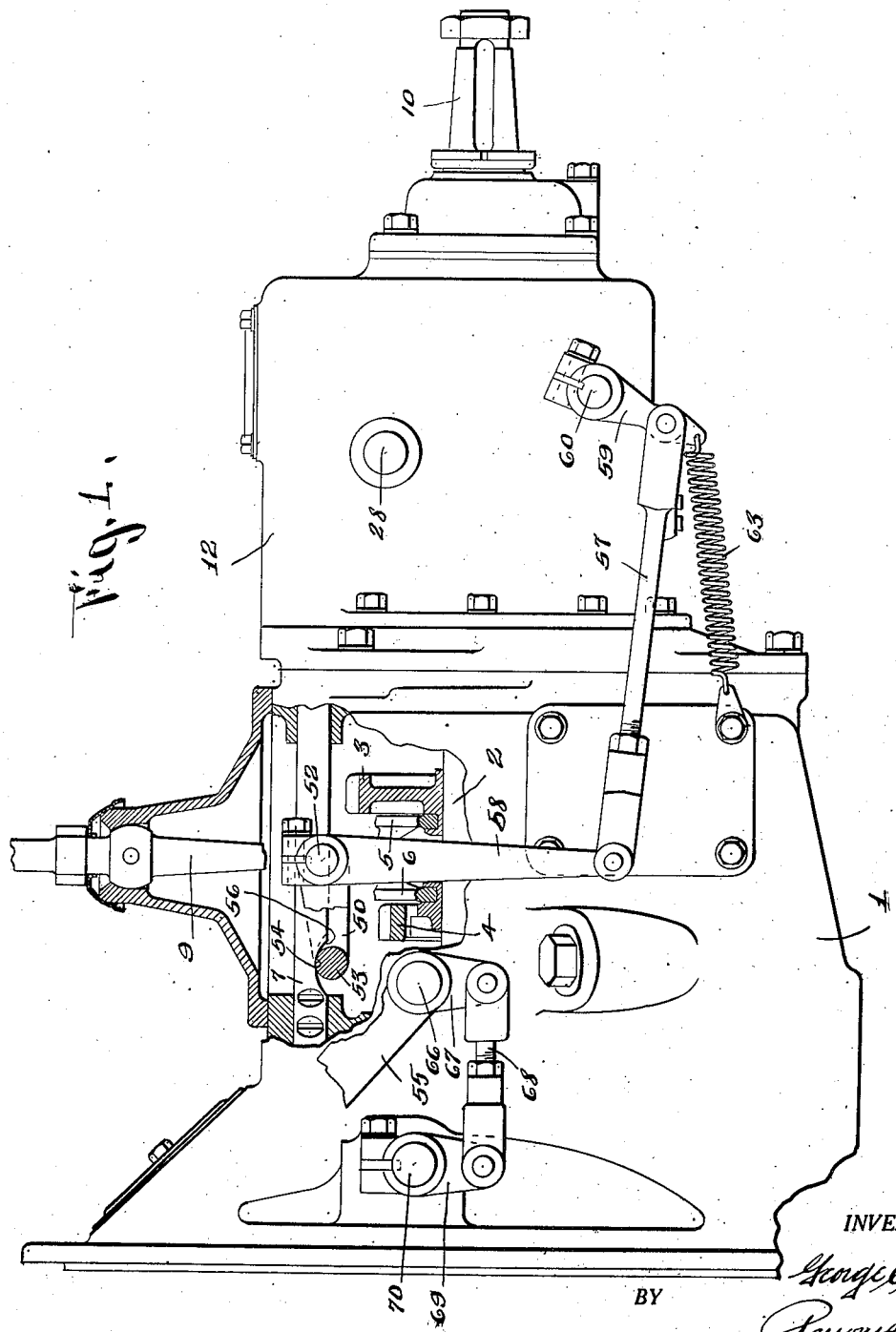
Figure 1 is a side elevation, partly broken away, of a transmission mechanism embodying my invention.

This transmission mechanism comprises generally a gear set or change speed gearing which includes shiftable members as sliding gears, a driven shaft actuated by the gear set and connected to the propeller shaft of the vehicle, a clutch connecting the gear set and said shaft comprising normally engaged sections, one of which is shiftable, power operated throw-out mechanism for shifting the shiftable section and motion transmitting means actuated by some part which is operated during gear shifting operations for controlling the operation of the power throw-out means.

The gear set or change speed gearing may be of any suitable form, size and construction, it including the usual alined driving and driven shafts, a counter-shaft, gears between the shafts, some of which are shiftable and means for shifting the shiftable gears. The driving shaft of the gearing is connected to the engine or the fly wheel thereof through the usual main clutch which is thrown out by the clutch pedal.

1 designates the casing of the gear set or change speed gearing.

2 the transmission shaft which is alined with the driving shaft of the gearing.

3 and 4 are shiftable gears mounted on the shaft 2 and rotatable therewith and shiftable into and out of mesh with gears on the counter-shaft. Shifting of the gear 4 from neutral position to the right produces reverse speed and to the left from neutral, low speed forward. Shifting of the gear 4 to the right from neutral produces intermediate speed forward and to the left from neutral engages clutch faces on such gear 4 and on a gear on the drive shaft to produce direct drive or high speed forward, all of which will be understood by those skilled in the art.

As the construction of a change speed gearing and its relation to the main clutch and the engine or fly wheel is well known further description is thought to be unnecessary.

The gears 3, 4 are shifted by means of forks 5, 6 connected to slide rods 7 and 8 suitably mounted in any well known manner in the case 1 and these slide rods are operated by a selecting and shifting lever 9.

10 is a driven shaft actuated by the gear set, this shaft being journalled at its rear end in a bearing 11 in the rear wall of the casing 12, and journalled at its front end at 13 in a pilot bearing in the transmission shaft 2. The case 12 is suitably secured to the rear wall of the case 1 for the gear set. The shaft 10 is connected at its rear end to the propeller shaft of the vehicle through a suitable universal joint.

14 designates, generally, the clutch connecting the gear set or the shaft 2 thereof and the driven shaft 10. The clutch here illustrated comprises a section 15 rotatable with the shaft 2 and located within the case 12, a section 16 rotatable with the shaft 10, interleaved disks interlocked respectively with the sections 15 and 16, a shiftable section as a pressure plate 18 acting to compress the disks and springs 19 suitably arranged to act on the pressure plate.

Figure 3:
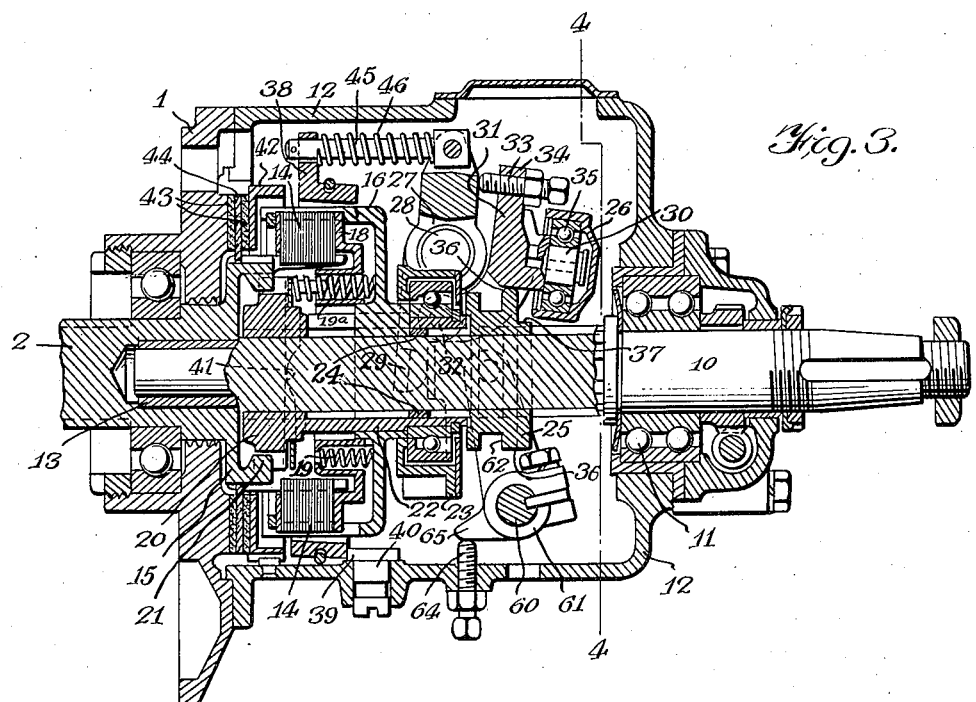
Figure 3 is a longitudinal vertical sectional view of the clutch for connecting and disconnecting the gear set from the torque of the propeller shaft, the same being taken on line 3—3, Figure 4.

It further includes a shiftable section 20 for positively interlocking with the section 15, the section 20 being a toothed head slidable axially of the shaft 10 to bring teeth thereon into and out of interlocking engagement with internal teeth 21 provided on the section 15. The sliding head 20 is carried by a sleeve 22 slidable axially of the shaft 10 and splined thereto and connected to a throw-out collar 23 at its rear end. The section 20 is also splined to the shaft 10, and the sleeve 22 is provided with elongated slots permitting the splines on the hub of the section 16 to interlock with the splines on the shaft 10 and also permitting the axial shifting of the sleeve 22. The section 16 is held from axial movement by a thrust ring 24. Springs 19ᵃ are also interposed between the section 16 and the head 20. The throw-out collar 23 may be of any suitable form, size and construction and as the construction of this clutch forms no part of this invention, further description is thought to be unnecessary. During the movement of the throw-out collar 23 to the right, Figure 3, the sleeve 22 first moves to the right withdrawing the clutch head 20 out of engagement with the head 15 thus disengaging the positive clutch, and further movement causes the head 20 to abut against the pressure ring 18 or the ends of the portions thereof formed with the passages or sockets for the springs 19, 19ᵃ and moves the pressure ring to the right sufficiently to relieve the pressure on the disks 14 so that the friction clutch is disengaged. When the force tending to move the throw-out collar 23 to the right is discontinued, the springs 19ᵃ and 19 return the clutch head 20 and the pressure disk 18 to their normal engaging positions, the friction disk first engaging in advance of the positive clutch sections 20 and 15.

Figure 4:
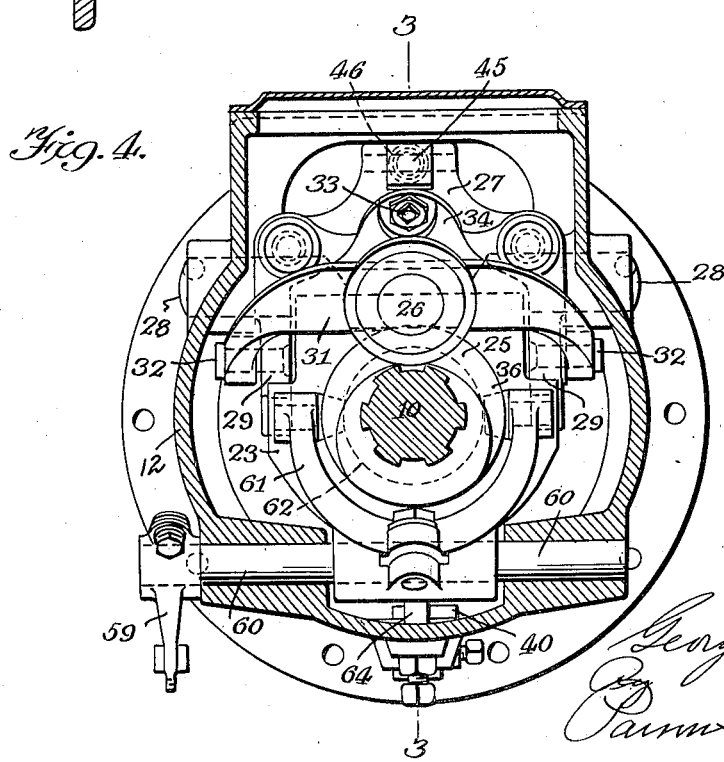
Figure 4 is a sectional view looking to the left on line 4—4, Figure 3.

The shiftable sections 16 and 22 of the clutch are shifted by power means in order to relieve the gear set of the torque of the shaft 10 during gear shifting operations; and in the illustrated embodiment of my invention, this power means is actuated by the shaft 10 and includes an actuator as a cam 25 rotatable with the shaft 10 and motion transmitting means between the actuator and the shiftable clutch sections including a follower 26 coacting with the cam. The cam 25 and the follower 26 being normally out of coacting or effective relation. In the illustrated embodiment of my invention, the cam actuator 25 rotates with the shaft 10 instead of being loose on the shaft and connectable thereto by a manually operated clutch or by shiftable keys, and also this cam is shiftable axially of the shaft into and out of engagement with the cam follower 26. This cam follower 26 is connected to a yoke or fork 27 coacting with the throw-out collar 23. The yoke 27 is here shown as mounted upon trunnions or spindles 28 journalled in opposite walls of the casing 12, the arms 29 of the yoke thrusts against the throw-out collar 23. The follower is carried on a stud 30 arranged radially relatively to the axis of the yoke 27 and carried by a second yoke 31 which is pivoted at 32 to the yoke 27 below the axis thereof or below the studs 28. The fork 27 is adjusted relatively to the throw-out collar 23 by means of a set of screw 33 threading through an arm 34 projecting upwardly from the yoke 31 and thrusting against the yoke 27. An antifriction bearing 35 is usually interposed between the follower and the arm 30. The cam 25 is formed with a concentric high portion 36 and an eccentric low portion 37 which merges into the high portion 36. The yoke is also connected to a brake operating lever 38 in the form of a ring encircling the clutch section 16 and fulcruming at 39 against a stud 40 in the bottom of the case and thrusting at 41 between its ends against a brake ring 42 which acts to compress brake disks 43 against the rear wall of the transmission case 1, one of these disks 44 being interlocked with the clutch section 15 to rotate therewith. This lever 38 is connected to the yoke by a push rod 45 pivoted at its rear end to the yoke and sliding at its front end through a hole in the lever 38, and a spring 46 is interposed between the lever 38 and the pivotal bearing of the rod 45. The cam 25 as seen in Figure 4 comprises an eccentric surface, a portion of which merges into a concentric surface. During the first movement of the cam follower or roller 26 into engagement with the cam, it engages the low part of the eccentric surface and when it has ridden to the high concentric surface thereof, it moves further over unto the peripheral high surface 36 and rides on this concentric high surface until shifted back to its normal position. While riding on the high concentric surface, the follower holds the parts in their shifted position and does not oscillate up and down.

The construction of the clutch and the throw-out mechanism therefor forms no part of my invention. This invention relates to means operated during the shifting of the gears of the gearing for controlling the operation of the throw-out mechanism by the power shaft.

The means operated by parts of the gear set which are shifted during gear shifting operations for controlling the effective engagement of the power actuator or cam 25 and the shifter connections including the follower 26 operated thereby, comprises connections between the shifter rods and the cam 25 to shift the cam. These connections comprise a member operated by either one of the slide rods 7 or 8 and means for transmitting the motion of said member to the cam 25. Said member includes a bar extending transversely of the rods 7 and 8, adapted to engage the peripheries of the rods and enter notches in the rods 7 and 8. The movement of the bar into and out of the notches shifts the power actuator or cam. In the illustrated embodiment of my invention, movement of the bar into the notches shifts the cam to throw out the clutch 14 and the bar is located to enter the notches when the rods 7 and 8 approach and are in neutral position.

50 designates the member coacting with the rod, this being a yoke mounted on shafts 51 and 52 mounted in opposite side walls of the gear case 1 and including a cross bar 53 connecting the opposite arm of the member 50, the cross bar 53 is arranged in notches as 54 formed in the slide rods. These notches are normally arranged to be brought into alinement as either shifter rod is brought to neutral position. It will be understood that one of such rods is in neutral position when the other is shifted. Therefore, when either rod is brought back into neutral position, the notches in the rods will be in alinement. When these rods 7 and 8 are in neutral position, and hence the gears 3 and 4 are in neutral position, the clutch 14 will be disengaged and hence the gear set relieved of torque from the propeller shaft. It will also be relieved of torque of the engine shaft during gear shifting operations as the main clutch is disengaged by depressing the foot pedal 55 preliminary to gear shifting operations.

The notches 54 are long enough in the direction of the length of the rods to permit shifting of the rods until the gears shifted thereby are brought into mesh with the companion gears before the incline of one side or the other of the notch depresses the bar 53 and hence actuates the member 50. As the throw of the shifter rods is comparatively short, the notches are also comparatively short. The opposite side walls of each notch 54 constitute cam surfaces for actuating the bar 53 and the cam surfaces 56 which actuate the bar when the gear 3 is being shifted to engage the high speed clutch is located slightly nearer the center of the notch than the other cam surfaces as the throw of the gear 3 to engage the high speed clutches is a trifle less than the throw of the gear 3 or the gear 4 into mesh with companion gears.

The shaft 52 is a rock shaft and rocks with the member 50 and is connected to shifter mechanism for the cam 25 by a link 57 pivoted at its front end to a lever arm 58 mounted on the shaft 52 and at its rear end to a rock arm 59 mounted on a rock shaft 60 extending transversely of the lower rear part of the case 12 and having mounted thereon a fork 61 which works in an annular groove 62 in the cam 25. A spring 63 is connected at one end to the case 1 and at its other end to the arm 59 to move said arm 59 in one direction to shift the cam 25 under the cam follower 26 when both notches 54 are in alinement with the bar 53. Owing to the spring any momentary retardation of the cam 25 when moving under the follower does not affect the sliding of the rods 7 or 8.

The initial position of the fork 62 is determined by a set screw 64 threading through the bottom of the case 12 and coacting with a radial arm 65 on the yoke 61. The main clutch pedal 55 is here shown as mounted upon a stud 66 projecting from one side of the gear case 1 and as having a lever arm 67 connected by a link 68 to a rock arm 69 mounted on the throw-out yoke shaft 70 of the main clutch.

The member 50 which carries the bar 53 is loosely mounted on the shaft 51 which is a stud extending through the side walls of the gear case, this stud also serving as a support for a brake lever not shown.

In operation, upon the shifting of either rod 7 or 8 from neutral either the gear 3 or 4 is shifted in one direction or the other and after such gear is shifted into mesh or partly into mesh with the companion gear or after the clutch face on the gear 3 has been shifted into engagement or partly into engagement with the complemental clutch face, the bar 53 engages one of the inclined walls of the notch 54 depressing the member 50 and actuating the lever arm 58 and link 57 rearwardly causing the fork 61 to shift the cam 25 out from under the cam follower so that the clutch springs 19 and 19a are free to act to engage the clutch 14.

When the rod so shifted is shifted back to neutral position, the notches again come into alinement permitting the spring 63 acting on the rock arm 59 of the shifting fork for the cam 25 to shift the cam 25 rearwardly under the cam follower 26 so that the clutch 14 is thrown out or disengaged, and remains disengaged as long as both shifter rods 7 and 8 are in neutral position.

What I claim is:

1. In a transmission mechanism, the combination with a gear set including a shiftable member, and shifting means for said member, a driven shaft actuated by the gear set, of a clutch connecting the gear set and said shaft including normally engaged sections, one of which is shiftable, power operated throw-out mechanism for shifting the shiftable section, and means operated by the shifting means of the gear set for controlling the effective operation of the power means.

2. In a transmission mechanism, the combination with a gear set including shiftable members, and shifting means for said members, a driven shaft actuated by the gear set of a clutch connecting the gear set and said shaft including normally engaged sections, one of which is shiftable, power-operated throw-out means for the shiftable section, and means operated by the shifting means of the gear set when operated to shift any one of said members for controlling the effective operation of the power means.

3. In a transmission mechanism, the combination with a gear set including shiftable members, and means for shifting said members including parts individual to said members, of a driven shaft actuated by the gear set, a clutch connecting the gear set and said shaft, including normally engaged sections, one of which is shiftable, power-operated throw-out means for shifting the shiftable clutch section, including a rotatable actuator normally ineffective during the normal operation of the transmission mechanism, means operated by the shifting of any one of said parts of the gear set for controlling the effective operation of the power actuator and means cooperating with said rotatable actuator and shiftable clutch member for operating the same.

4. In a transmission mechanism, the combination with a gear set, including shiftable members, and means for shifting said members including slide rods individual to said members, of a driven shaft actuated by the gear set, a clutch connecting the gear set and said shaft including normally engaged sections, one of which is shiftable, a power-operated actuator for shifting the shiftable section, and means operated by either of the slide rods for controlling the effective operation of the power actuator.

5. In a transmission mechanism, the combination with a gear set, including shiftable members, and means for shifting said members including slide rods formed with notches having inclined side walls of a driven shaft actuated by the gear set, a clutch connecting the gear set and said shaft, including normally engaged sections, one of which is shiftable, power-operated throw-out means for shifting the shiftable section, and means operated by the slide rods for controlling the effective operation of the power means, comprising a motion transmitting member having a bar arranged in the notches of the slide rods when said rods are in neutral position and shiftable out of said notches to actuate said motion transmitting member upon the sliding of either rod.

6. In a transmission mechanism, the combination with a gear set, including shiftable members, and means for shifting said members including slide rods formed with notches having inclined side walls of a driven shaft actuated by the gear set, a clutch connecting the gear set and said shaft, including normally engaged sections, one of which is shiftable, power-operated throw-out means for shifting the shiftable section, and means operated by the slide rods for controlling the effective operation of the power means, comprising a motion transmitting member having a bar arranged in the notches of the slide rods when said rods are in neutral position and shiftable out of said notches to actuate said motion transmitting member upon the sliding of either rod, and a spring for shifting the bar into the notches.

7. In a transmission mechanism, the combination with a gear set, including shiftable members, and means for shifting the shiftable members, comprising slide rods, each formed with a single notch having inclined side walls, of a driven shaft actuated by the gear set, a clutch connecting the gear set and the shaft, including normally engaged sections, one of which is shiftable, power-operated means for shifting the shiftable clutch section, and mechanism operated by any one of the rods of the gear set for controlling the effective operation of the power means, comprising a lever having a follower arranged to enter the notches of all the slide rods when said rods are in neutral position and shiftable out of said notches to actuate the lever upon the shifting of any one of said rods.

8. In a transmission mechanism, the combination with a gear set, including shiftable members, and means for shifting the shiftable members, comprising slide rods, each formed with a single notch having inclined side walls, of a driven shaft actuated by the gear set, a clutch connecting the gear set and the shaft, including normally engaged sections, one of which is shiftable, power-operated means for shifting the shiftable clutch section, and mechanism operated by any one of the rods of the gear set for controlling the effective operation of the power means, comprising a lever having a follower arranged to enter the notches of all the slide rods when said rods are in neutral position and shiftable out of said notches to actuate the lever upon the shifting of any one of said rods, and a spring tending to move the lever into and the follower into the notches.

9. In a transmission mechanism, the combination with a gear set including shiftable members, and means for shifting the shiftable members, comprising slide rods, each formed with a notch having inclined side walls; of a driven shaft actuated by the gear set, a clutch connecting the gear set and the shaft, including normally engaged sections, one of which is shiftable, power-operated mechanism for shifting the shiftable clutch section, and mechanism operated by the rods of the gear set for controlling the effective operation of the power means, comprising a pivoted yoke having an intermediate bar portion extending transversely of the rods arranged to enter the notches and shiftable out of the notches to actuate the yoke upon shifting of either of said rods.

10. In a transmission mechanism, the combination with a gear set, including shiftable members, and means for shifting the shiftable members, including parts individual to the shiftable member, each formed with a single notch having inclined side walls a driven shaft actuated by the gear set, a clutch connecting the gear set and said shaft, including normally engaged sections, one of which is shiftable, power actuated throw-out means for shifting the shiftable section out of clutching position when the shiftable members of the gear set are in neutral position and means operated by any one of said parts for controlling the effective operation of the throw-out means, comprising a motion transmitting member having a bar extending transversely of and engaging said parts and arranged to move into said notches when both parts are in neutral position, and hence throw out the shiftable clutch section, and to throw in such section when any one of said parts is moved out of neutral position.

11. In a transmission mechanism, the combination with a gear set, including shiftable members, and means for shifting the shiftable members, including parts individual to the shiftable members and formed with notches arranged in transverse alinement when said members are in neutral position; of a driven shaft actuated by the gear set, a clutch connecting the gear set and said shaft, including normally engaged sections, one of which is shiftable, throw-out means for shifting the shiftable section out of clutching position when the shiftable members of the gear set are in neutral position, and means operated by said parts for controlling the effective operation of the means to throw out the shiftable clutch section, comprising a motion transmitting member having a bar extending transversely of and engaging said parts and arranged to move into said notches when both parts are in neutral position, and hence throw out the shiftable clutch section and to throw in the section when any one of the rods is moved out of neutral position, such notches being of sufficient width to delay the operation of the throw-out means until the shiftable members of the gearing have been brought into partly engaged position.

12. In a transmission gearing, the combination with a gear set, including shiftable members, and means for shifting the shiftable members including parts individual to said members; of a driven shaft actuated by the gear set, a clutch connecting the gear set and said shaft, including normally engaged sections, one of which is shiftable, power-operated means associated with said shaft for shifting the shiftable section, and being normally out of position to throw out the shiftable section, and means operated by the shifting means of the gear set when shifting any one of said members for controlling the effective actuation of said power throw-out means.

13. In a transmission mechanism, the combination with a gear set, including shiftable members, and means for shifting said member, including slide rods individual to said members, of a driven shaft actuated by the gear set, a clutch connecting the gear set and said shaft including normally engaged sections, one of which is shiftable, power-operated throw-out means for shifting the shiftable sections, comprising a power member on said shaft, and motion transmitting mechanism between said power member and the shiftable clutch section, such motion transmitting mechanism and the power member being normally out of operating position, and connections operated by any one of the slide rods for bringing the power member and the motion transmitting mechanism into effective relation.

14. In a transmission mechanism, the combination with a gear set including shiftable members, and means for shifting said members, comprising slide rods individual to said members, each slide rod being formed with a single notch having inclined side walls, and said notches being arranged in transverse alinement when such rods are in neutral position; of a driven shaft actuated by the gear set, a clutch connecting the gear set and said shaft, including normally engaged sections one of which is shiftable, power-operated throw-out means for the shiftable section, comprising a cam rotatable with the driven shaft, and a cam follower for coacting with the cam, the cam and the cam follower being normally out of coacting relation, and connections operated by any one of the shifter rods to effect the active coaction of the cam and the follower, including a bar extending transversely of the shifter rods in position to enter the notches of all the rods when the rods are in neutral position, and to shift out of such notches to actuate such connections when any one of the shifter rods is operated out of neutral position.

In testimony whereof, I have hereunto signed my name, at Syracuse, in the county of Onondaga, and State of New York, this 5th day of February, 1925.

GEORGE C. CARHART.